(12) United States Patent
Su et al.

(10) Patent No.: US 10,558,094 B2
(45) Date of Patent: *Feb. 11, 2020

(54) DISPLAY DEVICE WITH NOVEL SUB-PIXEL ARRANGEMENT

(71) Applicant: NOVATEK Microelectronics Corp., Hsin-Chu (TW)

(72) Inventors: Shang-Yu Su, New Taipei (TW); Hsueh-Yen Yang, Taoyuan (TW); Feng-Ting Pai, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,950

(22) Filed: Aug. 19, 2018

(65) Prior Publication Data

US 2018/0356695 A1 Dec. 13, 2018

Related U.S. Application Data

(63) Continuation of application No. 15/168,090, filed on May 29, 2016, now Pat. No. 10,061,167.

(51) Int. Cl.
*G02F 1/1343* (2006.01)
*G09G 3/36* (2006.01)
*G02F 1/1335* (2006.01)

(52) U.S. Cl.
CPC .. *G02F 1/134336* (2013.01); *G02F 1/134309* (2013.01); *G09G 3/3607* (2013.01);
(Continued)

(58) Field of Classification Search
CPC ... G02F 1/133514; G02F 2001/136222; G02F 2201/52; G02F 1/134336; G02F 1/134309; G02F 2001/134345; G09G 3/2003; G09G 2300/0452; G09G 2300/0443; G09G 3/3607; G09G 3/3611; G09G 5/02; G09G 2320/0233; G09G 3/3614; G09G 2320/0209; G02B 5/201; H01L 27/322; H01L 27/3213
See application file for complete search history.

(56) References Cited

U.S. PATENT DOCUMENTS 7,876,341 B2 1/2011 Credelle
9,449,373 B2 9/2016 Elliott
(Continued)

FOREIGN PATENT DOCUMENTS

CN 2906675 Y 5/2007
CN 101937142 A 1/2011
(Continued)

*Primary Examiner* — Jia X Pan
(74) *Attorney, Agent, or Firm* — Winston Hsu

(57) ABSTRACT

A display device includes a plurality of sub-pixel groups, wherein each of the plurality sub-pixel groups comprises eight sub-pixels disposed in a row direction or in a column direction and the eight sub-pixels comprise two red sub-pixels; two blue sub-pixels; two green sub-pixels; and two sub-pixels of a predetermined color, wherein in each of the plurality of sub-pixel groups, a distance between the red sub-pixels or between the blue sub-pixels is less than a distance between the green sub-pixels or between the sub-pixels of the predetermined color, and the sub-pixels of the predetermined color have a luminance higher than a luminance of the red sub-pixels and the blue sub-pixels.

4 Claims, 16 Drawing Sheets

(52) U.S. Cl.
CPC ............ *G02F 1/133514* (2013.01); *G02F 2001/134345* (2013.01); *G02F 2201/52* (2013.01); *G09G 3/3614* (2013.01); *G09G 2300/0443* (2013.01); *G09G 2300/0452* (2013.01); *G09G 2320/0209* (2013.01); *G09G 2320/0233* (2013.01)

(56) References Cited

U.S. PATENT DOCUMENTS

| | | |
|---|---|---|
| 2002/0024491 A1 | 2/2002 | Hosoyamada |
| 2005/0225575 A1 | 10/2005 | Brown |
| 2011/0156992 A1 | 6/2011 | Moon |
| 2011/0227963 A1 | 9/2011 | Su |
| 2015/0170590 A1 | 6/2015 | Ahn |
| 2015/0237236 A1 | 8/2015 | Elliott |
| 2015/0253476 A1 | 9/2015 | Shao |
| 2015/0302808 A1 | 10/2015 | Wang |
| 2015/0379947 A1 | 12/2015 | Sang |
| 2016/0056203 A1 | 2/2016 | Kim |
| 2016/0351137 A1 | 12/2016 | Lee |

FOREIGN PATENT DOCUMENTS

| | | |
|---|---|---|
| CN | 1722193 | 4/2013 |
| CN | 103529572 | 1/2014 |
| CN | 103529588 A | 1/2014 |
| CN | 103714751 | 4/2014 |
| CN | 104025183 A | 9/2014 |
| CN | 104166263 A | 11/2014 |
| CN | 105225612 A | 1/2016 |
| TW | 201523568 A | 6/2015 |

US 10,558,094 B2

DISPLAY DEVICE WITH NOVEL SUB-PIXEL ARRANGEMENT

CROSS REFERENCE TO RELATED APPLICATIONS

This application is a continuation application of U.S. application Ser. No. 15/168,090, filed on May 29, 2016, the contents of which are incorporated herein by reference.

BACKGROUND OF THE INVENTION

1. Field of the Invention

The present invention relates to a display device, and more particularly, to a display device with a novel sub-pixel arrangement.

2. Description of the Prior Art

A liquid crystal display (LCD) is a flat panel display which has the advantages of low radiation, light weight and low power consumption and is widely used in various information technology (IT) products, such as notebook computers, personal digital assistants (PDA), and mobile phones. An active matrix thin film transistor (TFT) LCD is the most commonly used transistor type in LCD families, and particularly in the large-size LCD family. A driving system installed in the LCD includes a timing controller, source drivers and gate drivers. The source and gate drivers respectively control data lines and scan lines, which intersect to form a cell matrix. Each intersection is a cell including crystal display molecules and a TFT. In the driving system, the gate drivers are responsible for transmitting scan signals to gates of the TFTs to turn on the TFTs on the panel. The source drivers are responsible for converting digital image data, sent by the timing controller, into analog voltage signals and outputting the data voltage signals to sources of the TFTs.

In recent years, the requirement of the image quality gradually grows and pixels per inch (PPI) of the LCD keeps increasing to achieve the image quality. Meanwhile, the light transmittance of the LCD panel decreases when PPI increases. In conventional arts, white pixels are added for improving entire light transmittance of the LCD panel, and sub-pixel rendering (SPR) technique is also applied to enhance the aperture ratio of sub-pixels. Unfortunately, red/green/blue sub-pixel area is reduced along with adding white sub-pixels and the luminance of red/green/blue sub-pixels is degraded as a result, which also decreases the perceived brightness of the LCD panel.

SUMMARY OF THE INVENTION

In order to solve the above problem, the present invention provides a display device with a novel sub-pixel arrangement.

In an aspect, the present invention discloses a display device. The display device comprises a plurality of sub-pixel groups, wherein each of the plurality sub-pixel groups comprises eight sub-pixels disposed in a row direction or in a column direction. The eight sub-pixels of each of the plurality of sub-pixel groups comprise two red sub-pixels, two blue sub-pixels, two green sub-pixels, and two sub-pixels of a predetermined color. In each of the plurality of sub-pixel groups, a distance between the red sub-pixels or between the blue sub-pixels is less than a distance between the green sub-pixels or between the sub-pixels of the predetermined color, and the sub-pixels of the predetermined color have a luminance higher than a luminance of the red sub-pixels and the blue sub-pixels.

By adopting the sub-pixel arrangement of the present invention, not only the visually perceived brightness of the display device is increased, but also the luminance of lower luminance colors displayed by the display device is enhanced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
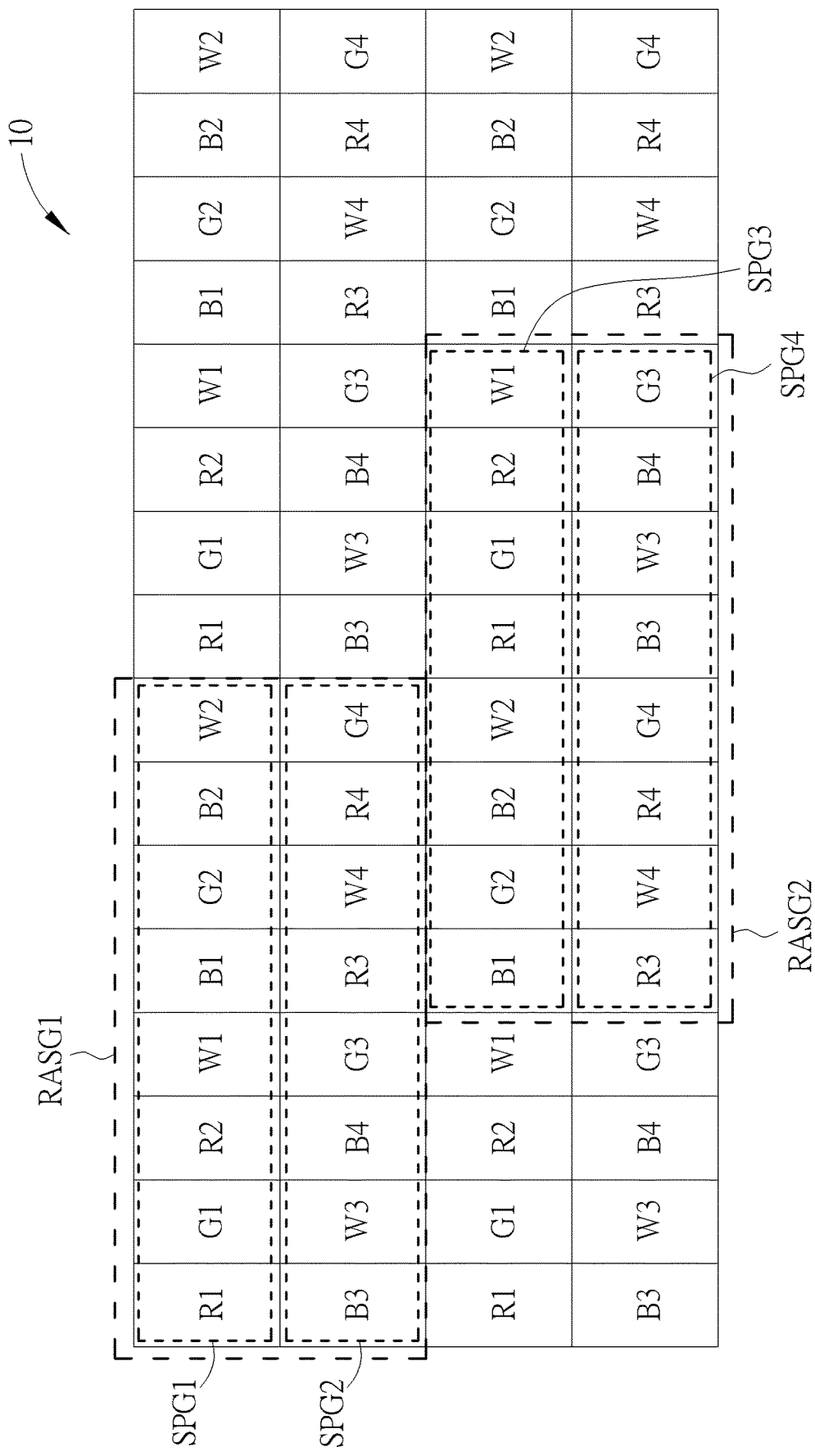
FIG. 1 is a schematic diagram of a display device according to an example of the present invention.

Please refer to FIG. 1, which is a schematic diagram of a display device 10 according to an example of the present invention. The display device 10 may be an electronic product with a liquid crystal panel, such as a television, a smart phone or a tablet, and is not limited herein. FIG. 1 only shows parts of sub-pixels of the display device 10 for illustrations. Note that, FIG. 1 is utilized for illustrating the relative positions of the sub-pixels and not for limiting the ratio of length to width of each of sub-pixels. As shown in FIG. 1, the display device 10 comprises a plurality of repeatedly arranged sub-pixel groups RASG1 (only one repeatedly arranged sub-pixel group RASG1 is marked in FIG. 1 for simplicity). The repeatedly arranged sub-pixel group RASG1 comprises sub-pixels of a predetermined color whose luminance is greater than that of red and blue, to increase the perceived brightness of the display device 10. In an example, the predetermined color is white, yellow, cyan, or magenta. Further, a horizontal distance between the sub-pixels of a lower luminance color (i.e., red or blue) is smaller than a horizontal distance between the sub-pixels of a higher luminance color (i.e., green or the predetermined color such as white), to enhance the luminance of the lower luminance colors displayed by the display device 10.

Figure 2:
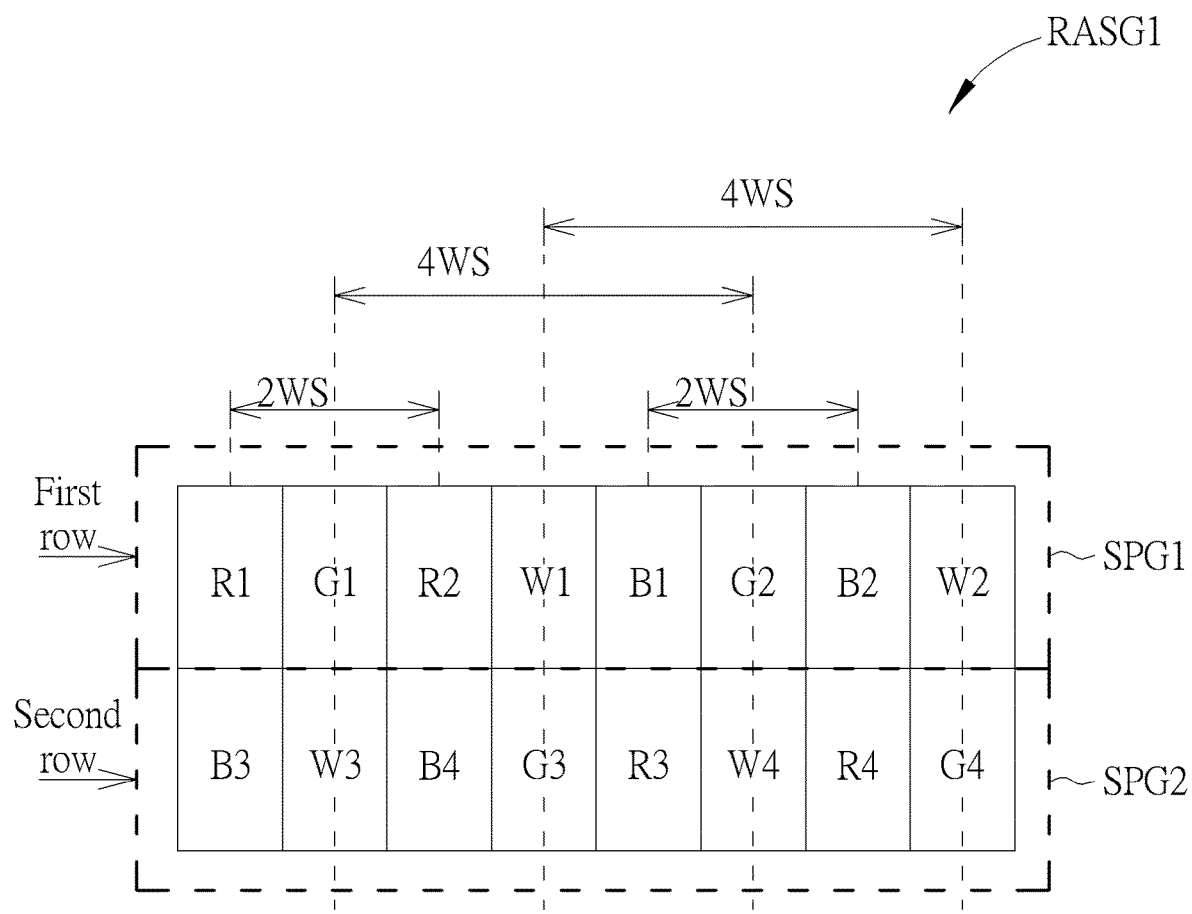
FIG. 2 is a schematic diagram of the repeatedly arranged sub-pixel group shown in FIG. 1.

Please refer to FIG. 2, which is a schematic diagram of the repeatedly arranged sub-pixel group RASG1 shown in FIG. 1. As shown in FIG. 2, the repeatedly arranged sub-pixel group RASG1 comprises adjacent sub-pixel groups SPG1 and SPG2. The sub-pixel group SPG1 comprises sub-pixels R1, G1, R2, W1, B1, G2, B2, W2 disposed in a row direction (e.g. the horizontal direction) from left to right at a first row. The sub-pixel group SPG2 comprises sub-pixels B3, W3, B4, G3, R3, W4, R4, G4 disposed in the row direction from left to right at a second row adjacent to the first row. As can be seen from FIGS. 1 and 2, the display device 10 can be realized by repeatedly disposing the sub-pixel groups SPG1 and SPG2.

In the repeatedly arranged sub-pixel group RASG1, the sub-pixels R1-R4 are red sub-pixels, the sub-pixels G1-G4 are green sub-pixels, the sub-pixels W1-W4 are sub-pixels of the predetermined color, and the sub-pixels B1-B4 are blue sub-pixels. That is, each of the sub-pixel groups SPG1 and SPG2 comprises 2 red sub-pixels, 2 green sub-pixels, 2 blue sub-pixels, and 2 sub-pixels of the predetermined color. The predetermined color may be white or any color except the pure red, green and blue, and the luminance of the predetermined color sub-pixel is greater than the luminance of red sub-pixel and the luminance of blue sub-pixel.

Note that, the adjacent sub-pixels in the repeatedly arranged sub-pixel group RASG1 are not corresponding to the same color. For example, the horizontally adjacent sub-pixels in each of the sub-pixel groups SPG1 and SPG2 have different colors and the vertically adjacent sub-pixels respectively in the sub-pixel groups SPG1 and SPG2 have different colors. Because the predetermined color is a relatively high luminance color, the brightness of the display device 10 is increased by adding the sub-pixels W1-W4 of the predetermined color.

However, the areas of the sub-pixels of red, green and blue are decreased when adding the sub-pixels of the predetermined color, resulting that the luminance of red, green, or blue displayed by the display device 10 becomes lower. In order to increase the luminance of red and blue, which are of relatively lower luminance than green, the two sub-pixels of red or blue are arranged in a closer distance than the distance between the two sub-pixels of green or the predetermined color. As shown in FIG. 2, the distance between the sub-pixels R1 and R2 or between the sub-pixels B1 and B2 is 2 WS, which is twice a unit sub-pixel width WS, and the distance between the green sub-pixels G1 and G2 or between the sub-pixels W1 and W2 of the predetermined color is 4 WS. The luminance of red and blue displayed by the display device 10 therefore can be enhanced by narrowing the distance between the red sub-pixels R1 and R2 or between the blue sub-pixels B1 and B2.

In the example shown in FIG. 2, a unit sub-pixel width (WS) may be defined as the distance between the center points of the two adjacent sub-pixels in the row direction, or defined as the width of a sub-pixel including necessary routing area associated with the sub-pixel.

Figure 3:
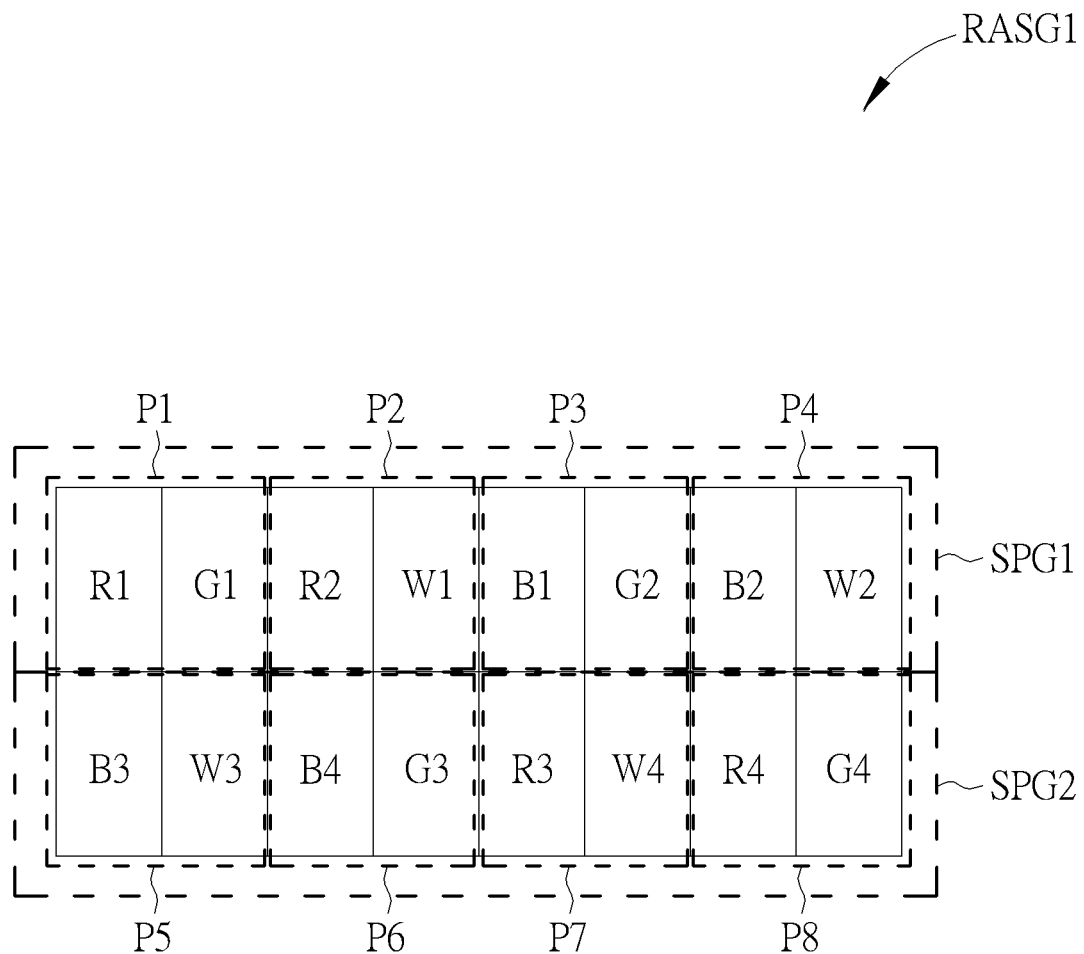
FIG. 3 is a schematic diagram of the repeatedly arranged sub-pixel group shown in FIG. 1.

As to the relationships between the pixels and the sub-pixels R1-R4, G1-G4, W1-W4, and B1-B4 in the repeatedly arranged sub-pixel group RASG1, please refer to FIG. 3. The sub-pixels R1 and G1 are corresponding to a pixel P1, the sub-pixels R2 and W1 are corresponding to a pixel P2, and so on. In FIG. 3, each of the pixels P1-P8 comprises 2 sub-pixels, i.e., the sub-pixel rendering (SPR) ratio is 1:2. According to different applications and design concepts, the number of the sub-pixels in each of pixels (i.e., the SPR ratio) maybe altered. As long as the number of the sub-pixels disposed in the row direction is a multiple of 8 (i.e. the multiple of the number of the sub-pixels disposed in the row direction in the repeatedly arranged sub-pixel group RASG1), the display device 10 can be realized by the repeatedly arranged sub-pixel group RASG1 no matter what the SPR ratio of the display device 10 is. For example, the SPR ratio of the display device 10 may be 1:3 or 1:4, and is not limited herein.

Further, the sub-pixels with the same color in each of the sub-pixel groups SPG1 and SPG2 are corresponding to different polarities. Please refer to FIGS. 4A and 4B, which are schematic diagrams of polarity arrangement of the repeatedly arranged sub-pixel group RASG1 shown in FIG. 2. In the repeatedly arranged sub-pixel group RASG1 shown in FIG. 4A, the sub-pixels of the same column (i.e. vertically adjacent sub-pixels) are corresponding to the same polarity. In the sub-pixel group SPG1, the red sub-pixel R1 is corresponding to a positive polarity and the red sub-pixel R2 is corresponding to a negative polarity, the green sub-pixel G1 is corresponding to the negative positive polarity and the green sub-pixel G2 is corresponding to the positive polarity, and so on. In other words, the sub-pixels with the same color in the sub-pixel groups SPG1 and SPG2 are corresponding to different polarities. The horizontal crosstalk phenomena in the display device 10 can be reduced because the polarity of each of the sub-pixels is different from that of at least one of horizontally adjacent sub-pixels.

Figure 4A:
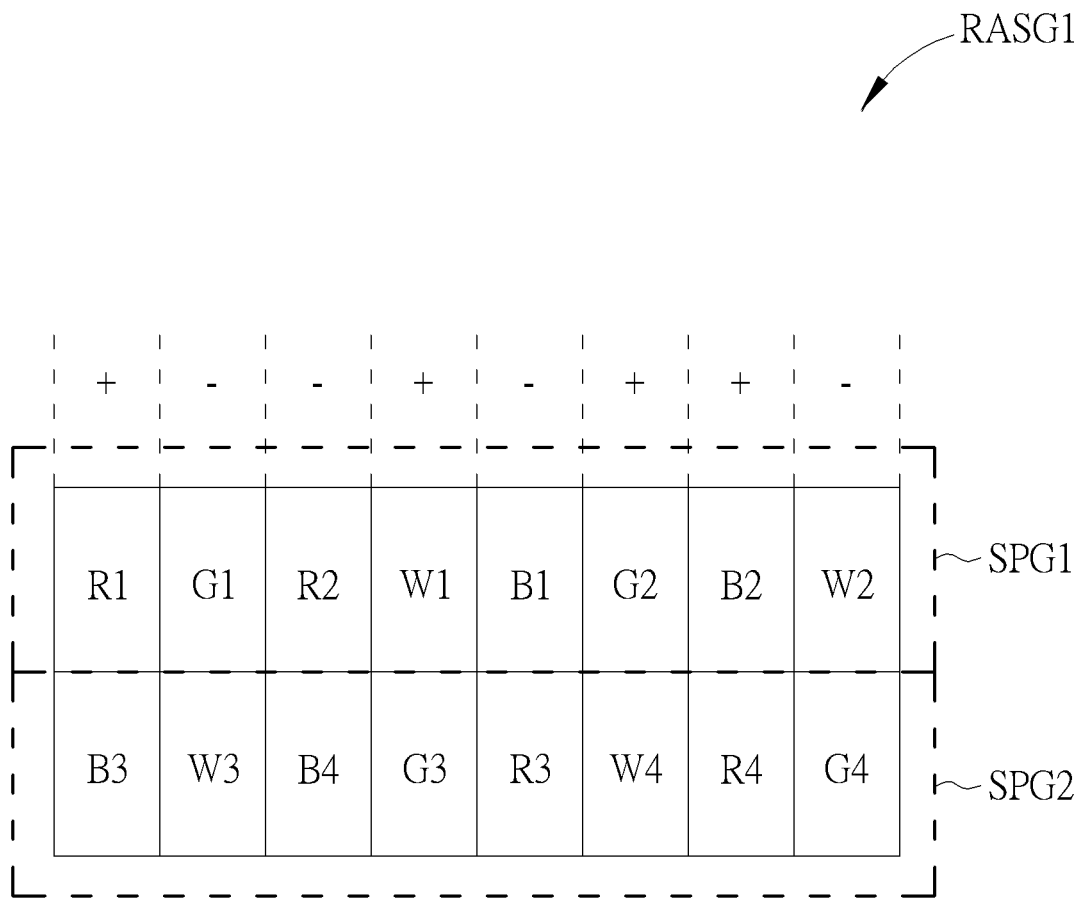
FIGS. 4A and 4B are schematic diagram of polarity arrangement of the repeatedly arranged sub-pixel group shown in FIG. 1.
Figure 4B:
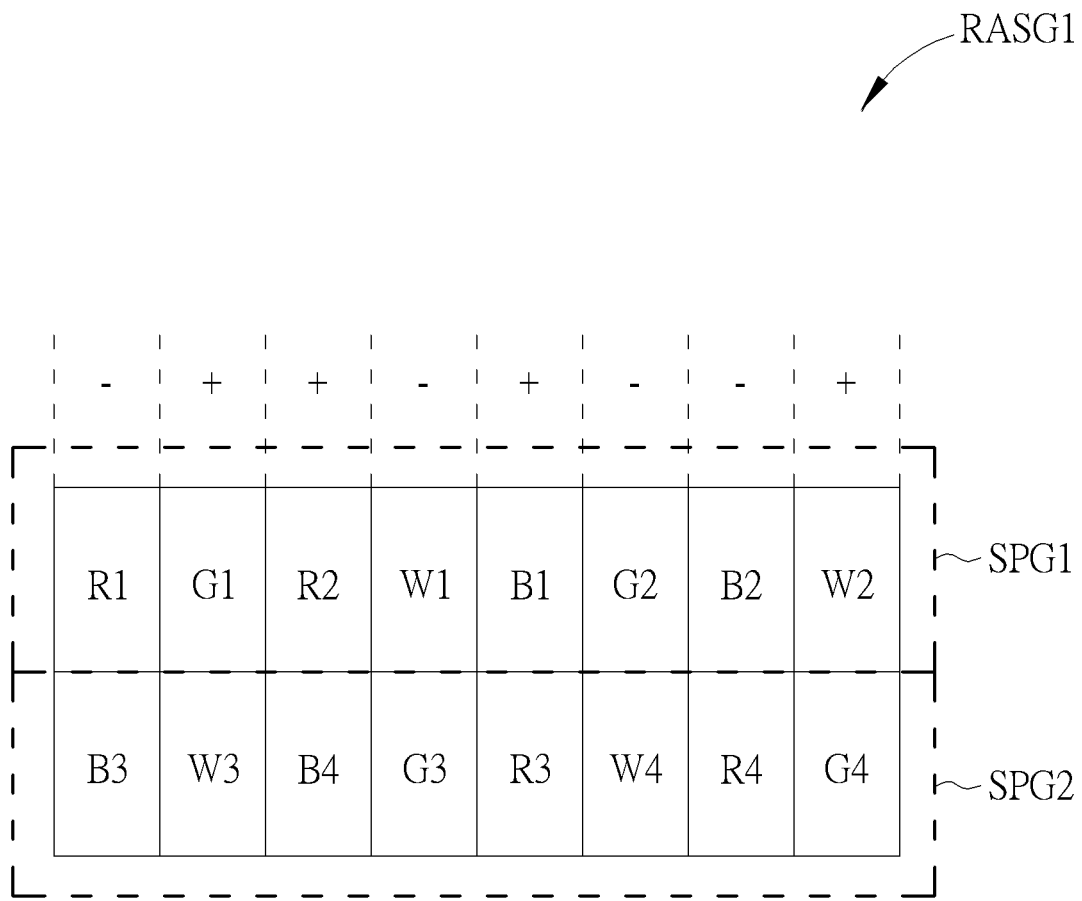

In FIG. 4B, the polarity of each of the sub-pixels is inverted from that shown in FIG. 4A. The red sub-pixel R1 is corresponding to the negative polarity and the red sub-pixel R2 is corresponding to the positive polarity, the green sub-pixel G1 is corresponding to the positive polarity and the green sub-pixel G2 is corresponding to the negative polarity, and so on. Since the polarity of each of the sub-pixels is different from that of at least one of horizontally adjacent sub-pixels, the horizontal crosstalk phenomena in the display device 10 can be reduced.

When adopting the sub-pixel arrangement shown in FIG. 2, the repeatedly arranged sub-pixel group RASG1 may operate in different operation modes to display colors. In an embodiment, a pixel Px in the repeatedly arranged sub-pixel group RASG1 displays a color component, such as red color, by only one red sub-pixel, which may be a red sub-pixel of the pixel Px if the pixel Px itself has it, or alternatively, a red sub-pixel of a neighbor pixel no matter the pixel Px itself has the red sub-pixel or not. In another embodiment, the pixel Px displays a color component, such as red, by not only a red sub-pixel of the pixel Px but also an another red sub-pixel (in a neighbor pixel) close to the pixel Px.

Figure 5A:
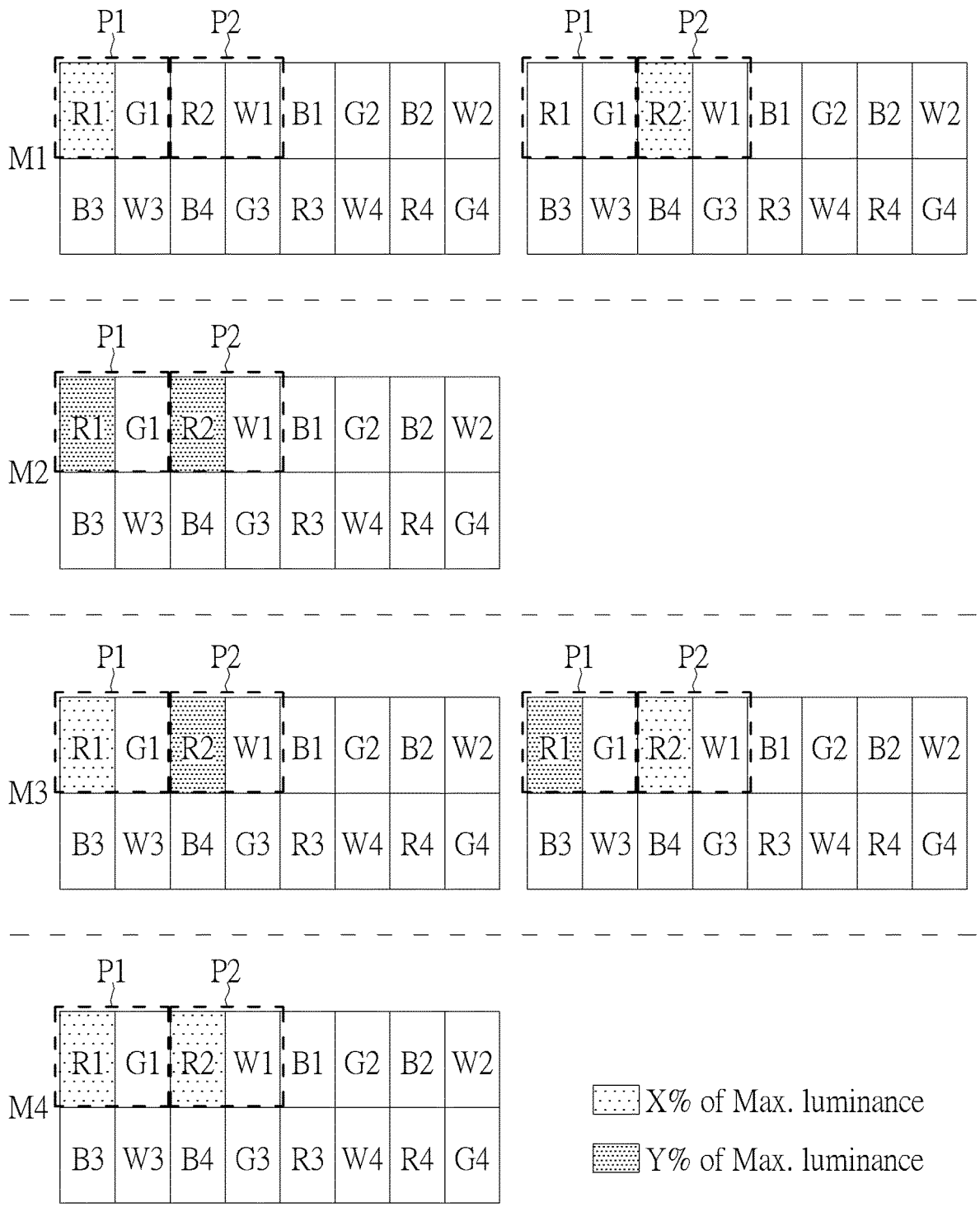
FIG. 5A is a schematic diagram of red sub-pixels of the repeatedly arranged sub-pixel group shown in FIG. 1 operating in different modes.

Please refer to FIG. 5A, which is a schematic diagram of red sub-pixels in the repeatedly arranged sub-pixel group RASG1 operating in different modes M1, M2, M3 and M4. In FIG. 5A, the pixel P1 and its neighbor pixel P2 are referred as an example. In the operation mode M1, the pixel P1 displays red component by the red sub-pixel R1 of the pixel P1 lightened with X % of the maximum luminance, wherein $50 \leq X \leq 100$ for example, or alternatively, by the red sub-pixel R2 of the pixel P2 lightened with X % of the maximum luminance instead of the red sub-pixel R1 of the pixel P1. Note that the maximum luminance depends on different color component. The maximum luminance of red sub-pixels may be different from the maximum luminance of blue or green sub-pixels.

In the operation mode M2, the pixel P1 displays red component by the red sub-pixel R1 lightened with Y % of the maximum luminance and the red sub-pixel R2 lightened with Y % of the maximum luminance, wherein 0≤Y≤50, for example. Therefore, the luminance of red component of the pixel P1 is enhanced by the red sub-pixel R2 of the pixel P2. In the above examples, if Y is equal to 0.5*X, the visually perceived brightness of the red component displayed in the operation modes M1 and M2 in the above examples are approximately the same because the red sub-pixel R1 and the red sub-pixel R2 are disposed as close as possible.

In the operation mode M3, the pixel P1 displays red component by the red sub-pixel R1 lightened with X % of the maximum luminance and the red sub-pixel R2 lightened with Y % of the maximum luminance, wherein 50≤X≤100 and 0≤Y≤50, for example; Alternatively, the pixel P1 displays red component by the red sub-pixel R1 lightened with Y % of the maximum luminance and the red sub-pixel R2 lightened with X % of the maximum luminance. Therefore, the luminance of red component of the pixel P1 is enhanced by the red sub-pixel R2 of the pixel P2. Under such a condition of the operation mode M3, the luminance of red component displayed by the pixel P1 may exceed the originally designed X % of maximum luminance of single sub-pixel.

The operation mode M4 is similar to the operation mode M2 but both the red sub-pixels R1 and R2 in the adjacent pixels P1 and P2 are lightened with X % of the maximum luminance, wherein 50≤X≤100. In the operation mode M4, the luminance of red component of a pixel is further increased, compared to the operation mode M2.

Figure 5B:
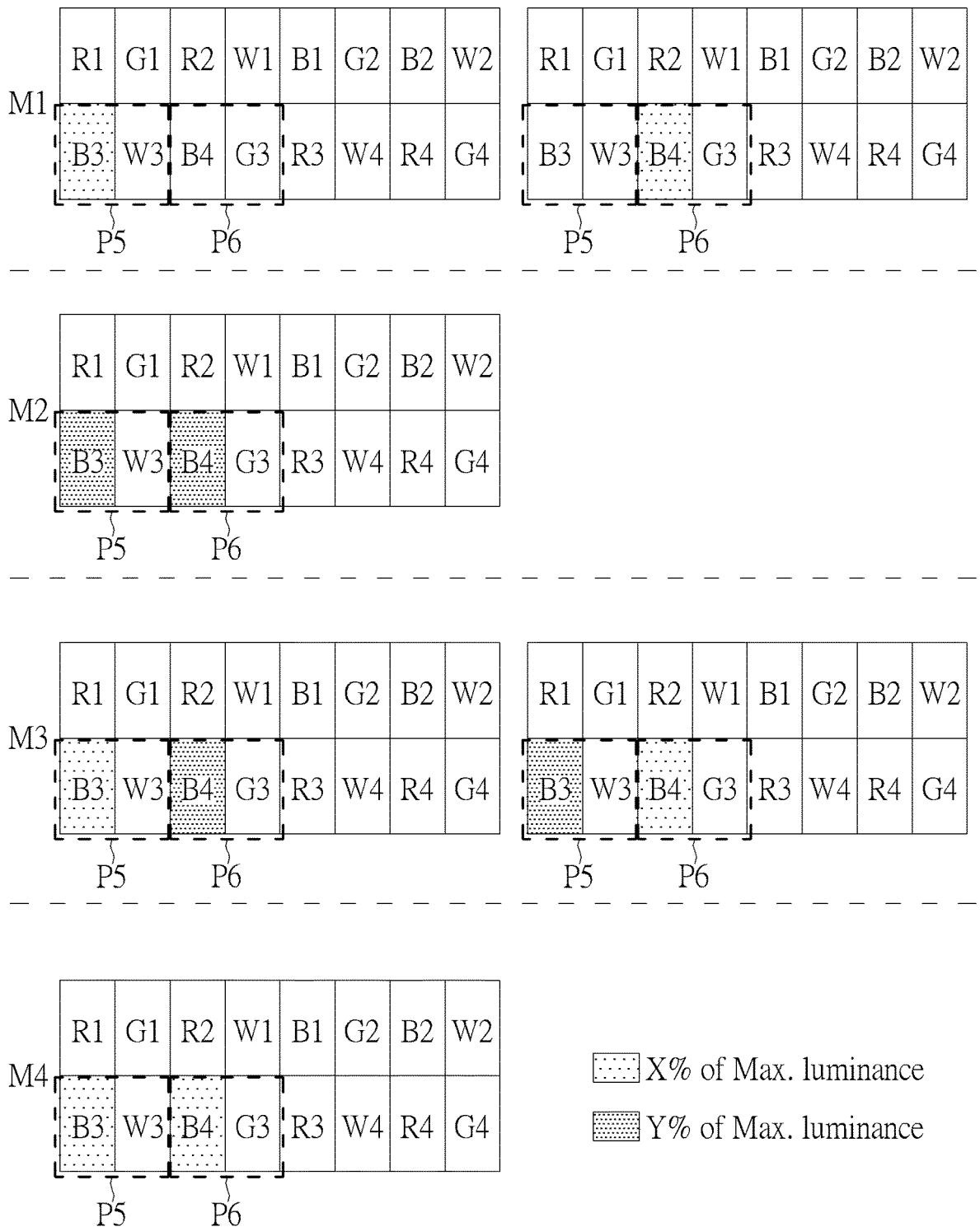
FIG. 5B is a schematic diagram of blue sub-pixels of the repeatedly arranged sub-pixel group shown in FIG. 1 operating in different modes.

Please refer to FIG. 5B, which is a schematic diagram of blue sub-pixels in the repeatedly arranged sub-pixel group RASG1 operating in four different operation modes M1-M4. In FIG. 5B, the pixel P5 and its neighbor pixel P6 are referred as an example, and the luminance of the blue sub-pixels B3 and B4 may be controlled in the same behaviors as the operation mode M1, M2, M3 or M4 in the example of FIG. 5A. According to the operation mode M1, the pixel P5 displays blue component by either the blue sub-pixel B3 or the blue sub-pixel B4. According to the operation mode M2, M3 or M4, the pixel P5 displays blue component by both of the blue sub-pixel B3 and the blue sub-pixel B4 and as a result, the luminance of blue component displayed by the pixel P5 may be enhanced.

Figure 5C:
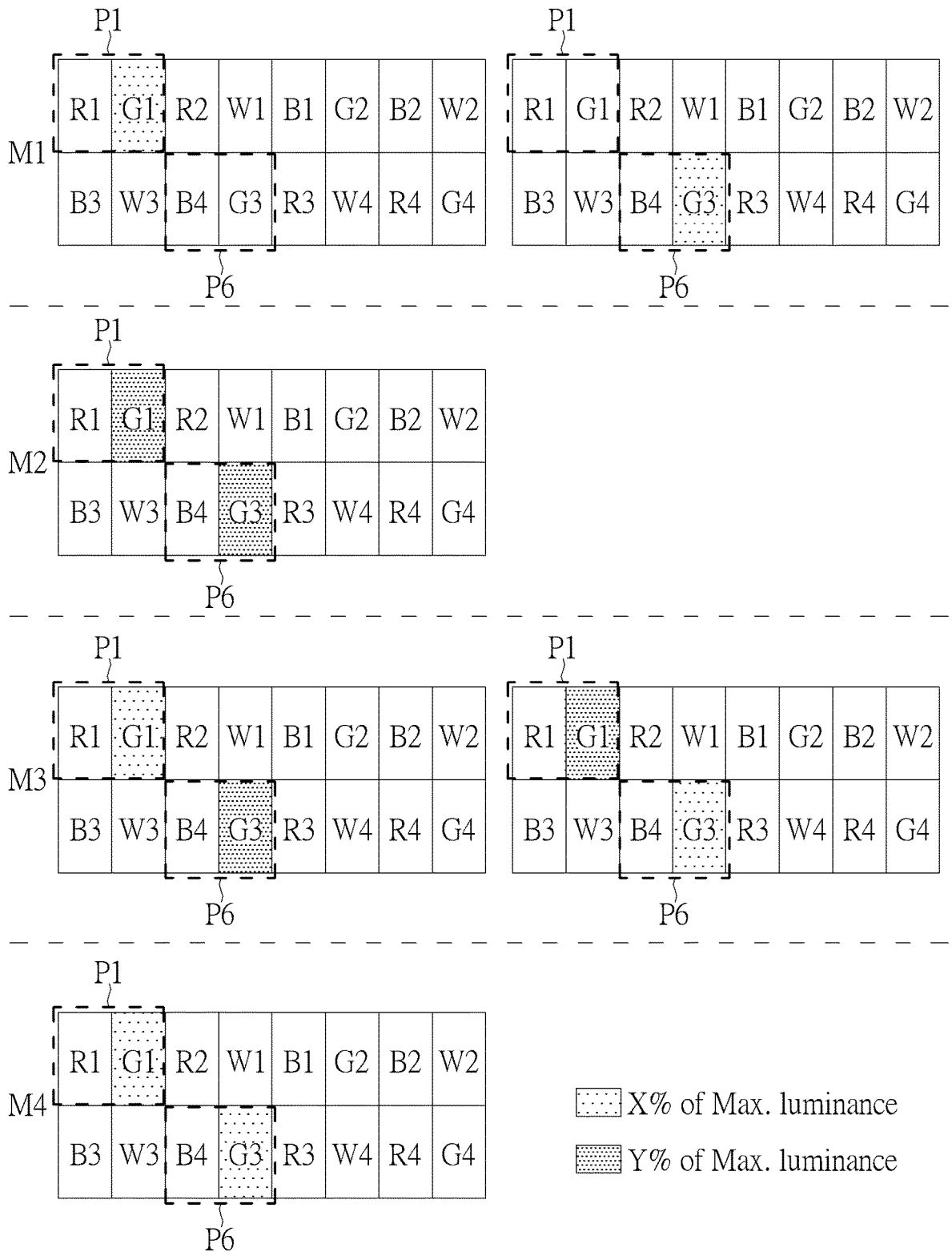
FIG. 5C is a schematic diagram of green sub-pixels of the repeatedly arranged sub-pixel group shown in FIG. 1 operating in different modes.

FIG. 5C is a schematic diagram of green sub-pixels in the repeatedly arranged sub-pixel group RASG1 operating in different operation modes M1-M4. In the example of FIG. 5C, the pixel P1 and it neighbor pixel P6 are referred as an example, and the luminance of the green sub-pixels G1 and G3 may be controlled in the same behaviors as the operation mode M1, M2, M3 or M4 in the example of FIG. 5A. According to the operation mode M1, the pixel P1 displays green component by either the green sub-pixel G1 or the green sub-pixel G3. According to the operation mode M2, M3 or M4, the pixel P1 displays green component by both of the green sub-pixel G1 and the green sub-pixel G3 and as a result, the luminance of green component displayed by the pixel P1 may be enhanced.

Figure 5D:
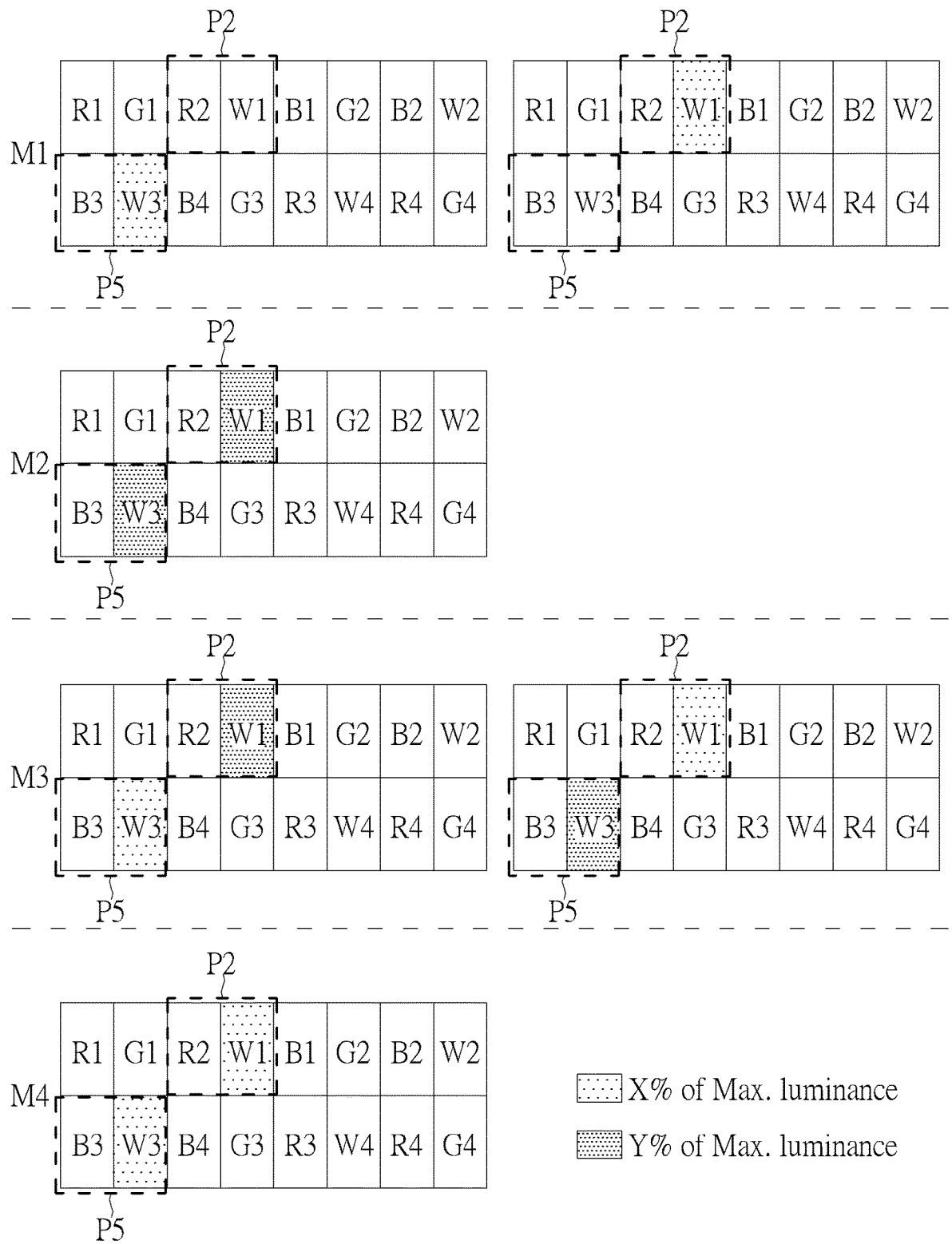
FIG. 5D is a schematic diagram of predetermined colored sub-pixels of the repeatedly arranged sub-pixel group shown in FIG. 1 operating in different modes.

FIG. 5D is a schematic diagram of white sub-pixels in the repeatedly arranged sub-pixel group RASG1 operating in different operation modes M1-M4. In the example of FIG. 5D, the pixel P2 and it neighbor pixel P5 are referred as an example, and the luminance of the predetermined colored (e.g., white) sub-pixels W1 and W3 may be controlled in the same behaviors as the operation mode M1, M2, M3 or M4 in the example of FIG. 5A.

Based on the operation mode M2, M3 or M4, when a pixel displays pure red or pure blue, the luminance of pure red or pure blue can be significant enhanced by additionally lightening a sub-pixel of the same color in a neighbor pixel. It should be noticed that the smaller distance (2 WS in FIG. 2) between two red sub-pixels or two blue sub-pixels helps realization of the operation mode M2, M3 or M4. Besides, the operation modes M2-M4 are not limited to display pure red/blue/green.

Note that, the display device 10 is not limited to be consisted of the repeated arranged sub-pixel group RASG1, sub-pixel group SPG1 or SPG2. Please refer to FIG. 1, a repeated arranged sub-pixel group RASG2 consisting of the sub-pixel groups SPG3 and SPG4 also can be regarded as a repeated arranged sub-pixel group of the display device 10. The sub-pixel group SPG3 can be regarded as a modified sub-pixel group SPG1 by interchanging the positions of red sub-pixels and the positions of blue sub-pixels in the sub-pixel group SPG1; and in another perspective, the sub-pixel group SPG3 can also be regarded as a modified sub-pixel group SPG2 by interchanging the positions of green sub-pixels and the positions of sub-pixels of the predetermined color in the sub-pixel group SPG2. Similarly, the sub-pixel group SPG4 can be regarded as a modified sub-pixel group SPG2 by interchanging the positions of red sub-pixels and the positions of blue sub-pixels in the sub-pixel group SPG2; in another perspective, the sub-pixel group SPG4 can also be regarded as a modified sub-pixel group SPG1 by interchanging the positions of green sub-pixels and the positions of sub-pixels of the predetermined color in the sub-pixel group SPG2.

Figure 6:
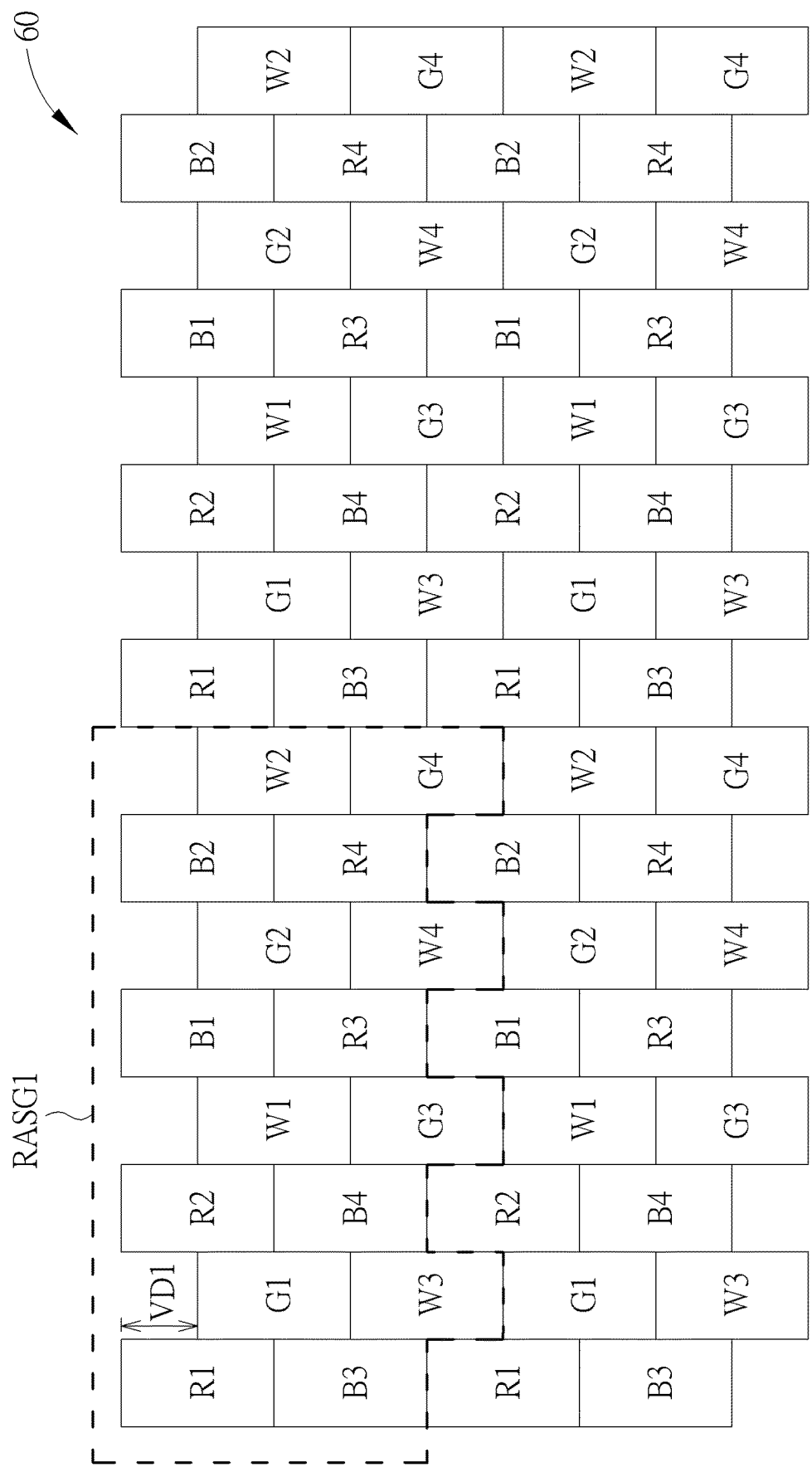
FIG. 6 is a schematic diagram of a display device according to an example of the present invention.

Please refer to FIG. 6, which is a schematic diagram of a display device 60 according to an example of the present invention. In comparison with the display device 10 shown in FIG. 1, a vertical displacement VD1 exists between the sub-pixels of odd columns and the sub-pixels of even columns. In other words, the vertical displacement VD1 exists between the horizontal adjacent sub-pixels disposed in each of the sub-pixel groups SPG1 and SPG2, whose sub-pixels are disposed in the row direction. In this example, the vertical displacement VD1 is smaller than or equal to half the vertical length of each sub-pixel.

Figure 7:
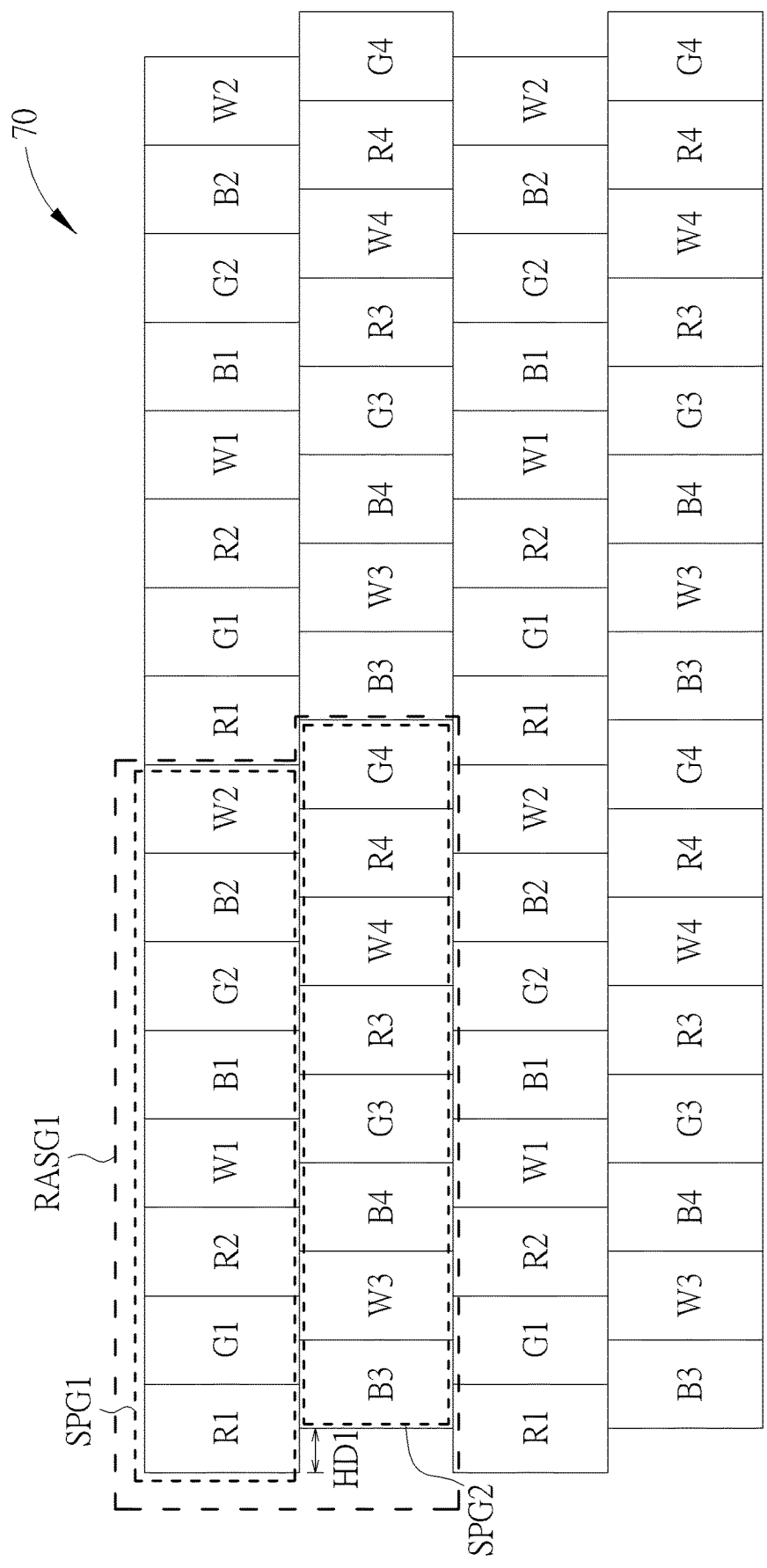
FIG. 7 is a schematic diagram of a display device according to an example of the present invention.

Please refer to FIG. 7, which is a schematic diagram of a display device 70 according to an example of the present invention. Different from the display device 10 shown in FIG. 1, the display device 70 has a horizontal displacement HD1 between the sub-pixels of odd rows and the sub-pixels of even rows. That is, the horizontal displacement HD1 exists between two vertical adjacent sub-pixels respectively disposed in each of the sub-pixel groups SPG1 and SPG2, whose sub-pixels are disposed in the row direction. In this example, the horizontal displacement HD1 is smaller than or equal to half the width WS of each sub-pixel.

Figure 8:
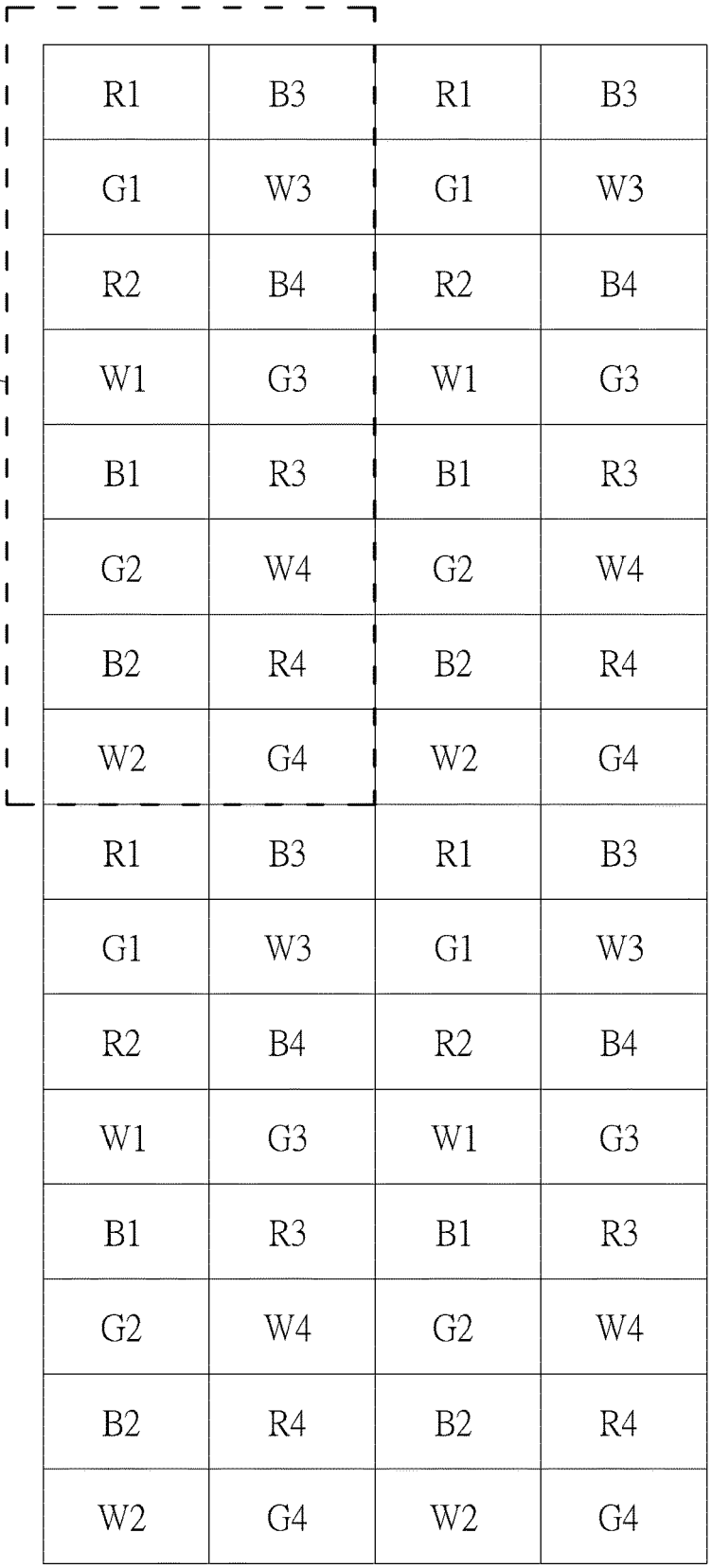
FIG. 8 is a schematic diagram of a display device according to an example of the present invention.

According to different applications and design concepts, the sub-pixels in each of the sub-pixel groups may be disposed in a column (e.g. vertical) direction. Please refer to FIG. 8, which is a schematic diagram of a display device 80 according to an example of the present invention. The display device 80 may be an electronic product with a liquid crystal panel, such as a television, a smart phone or a tablet, and is not limited herein. FIG. 8 only shows parts of sub-pixels of the display device 90 for illustrations. Note that, FIG. 8 is utilized for illustrating the relative positions of the sub-pixels and not for limiting the ratio between length and width of each of sub-pixels. As shown in FIG. 8, the display device 80 comprises a plurality of repeatedly arranged sub-pixel groups RASG3 (only one repeatedly arranged sub-pixel group RASG3 is marked in FIG. 8 for simplicity). The repeatedly arranged sub-pixel group RASG3 comprises sub-pixels of the predetermined color whose luminance is greater than the luminance of red sub-pixels and the luminance of blue sub-pixels, to increase the perceived brightness of the display device 80. For example, the predetermined color is white. Further, the distance between the lower luminance sub-pixels (i.e., red or blue) in the vertical direction is smaller than the distance between the higher luminance sub-pixels (e.g., green or the predetermined color) in the vertical direction, to enhance the luminance of the lower luminance colors displayed by the display device 80.

Figure 9:
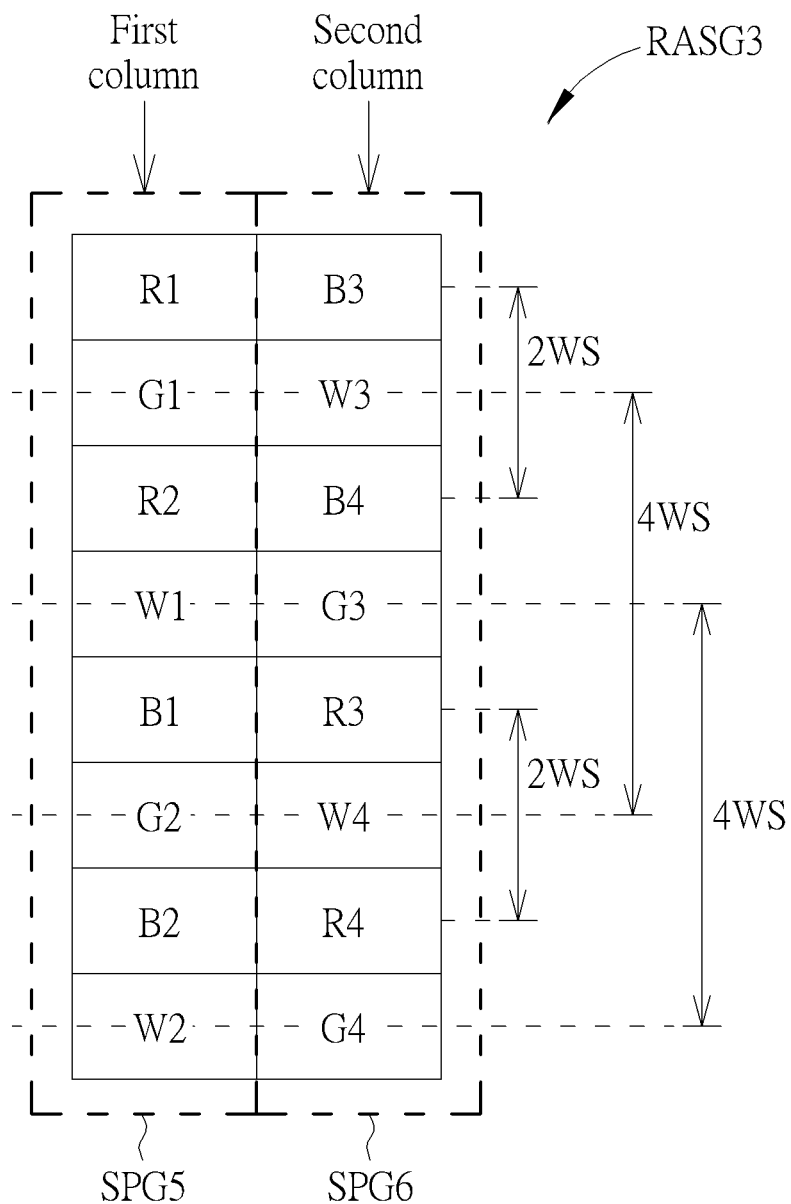
FIG. 9 is a schematic diagram of the repeatedly arranged sub-pixel group shown in FIG. 8.

Please refer to FIG. 9, which is a schematic diagram of the repeatedly arranged sub-pixel group RASG3 shown in FIG. 8. As shown in FIG. 9, the repeatedly arranged sub-pixel group RASG3 comprises adjacent sub-pixel groups SPG5 and SPG6. The sub-pixel group SPG5 comprises sub-pixels R1, G1, R2, W1, B1, G2, B2, and W1 disposed in a column direction (e.g. vertical direction) from top to bottom at a first column. The sub-pixel group SPG6 comprises sub-pixels B3, W3, B4, G3, R3, W4, R4, and G4 disposed in the column direction from top to bottom at a second column adjacent to the first column. As can be seen from FIGS. 8 and 9, the display device 80 can be realized by repeatedly disposing the sub-pixel groups SPG5 and SPG6.

In the repeatedly arranged sub-pixel group RASG3, the sub-pixels R1-R4 are red sub-pixels, the sub-pixels G1-G4 are green sub-pixels, the sub-pixels W1-W4 are sub-pixels of the predetermined color, and the sub-pixels B1-B4 are blue sub-pixels. That is, each of the sub-pixel groups SPG5 and SPG6 comprises 2 red sub-pixels, 2 green sub-pixels, 2 blue sub-pixels, and 2 sub-pixels of the predetermined color. Note that, the horizontally adjacent sub-pixels respectively disposed in the sub-pixel groups SPG5 and SPG6 have different colors. Since the luminance of the predetermined color is greater than the luminance of red sub-pixels and the luminance of blue sub-pixels, the perceived brightness of the display device 80 is increased by adding the sub-pixels W1-W4 of the predetermined color.

In FIG. 9, the distance (in vertical direction) between the sub-pixels R1 and R2 or between the sub-pixels B1 and B2 is 2 WS, and the distance (in vertical direction) between the sub-pixels G1 and G2 or between the sub-pixels W1 and W2 is 4 WS. Under such a condition, the luminance of red sub-pixels or blue sub-pixels displayed by the display device 80 can be enhanced when the red and blue sub-pixels are lightened according to behaviors similar to the operation mode M2, M3, or M4 illustrated in FIGS. 5A and 5B. Also, the green sub-pixels and the predetermined colored sub-pixels can be lightened according to behaviors similar to the operation mode M2, M3, or M4 illustrated in FIGS. 5C and 5D.

Figure 10:
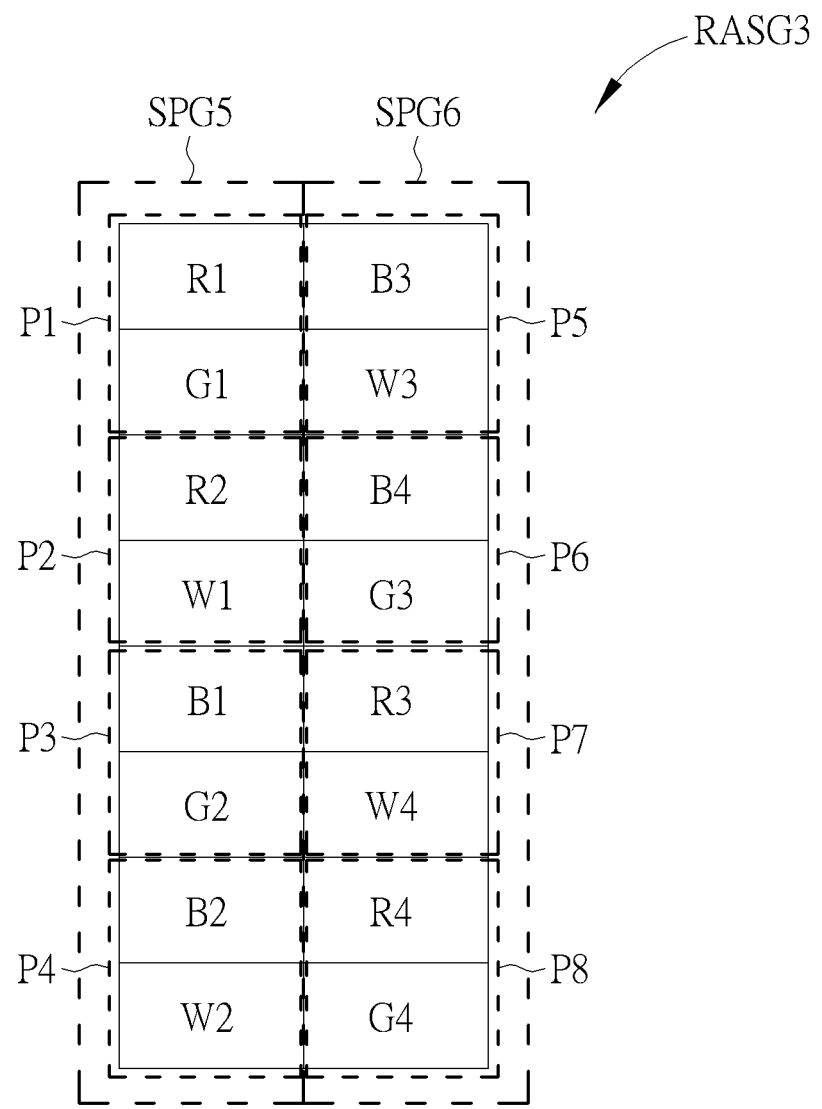
FIG. 10 is a schematic diagram of the repeatedly arranged sub-pixel group shown in FIG. 8.

As to the relationships between the pixels and the sub-pixels R1-R4, G1-G4, W1-W4, and B1-B4 in the repeatedly arranged sub-pixel group RASG3, please refer to FIG. 10. In a SPR ratio 1:2, the sub-pixels R1 and G1 are corresponding to a pixel P1, the sub-pixels R2 and W1 are corresponding to a pixel P2, and so on. According to different applications and design concepts, the number of the sub-pixels in each of pixels (i.e., the SPR ratio) may be altered. As long as the number of sub-pixels disposed in the column direction is a multiple of 8 (i.e., the multiple of the number of the sub-pixels disposed in the column direction in the repeatedly arranged sub-pixel group RASG3), the display device 80 can be realized by the repeatedly arranged sub-pixel group RASG3 no matter what the SPR ratio of the display device 80 is.

Figure 11:
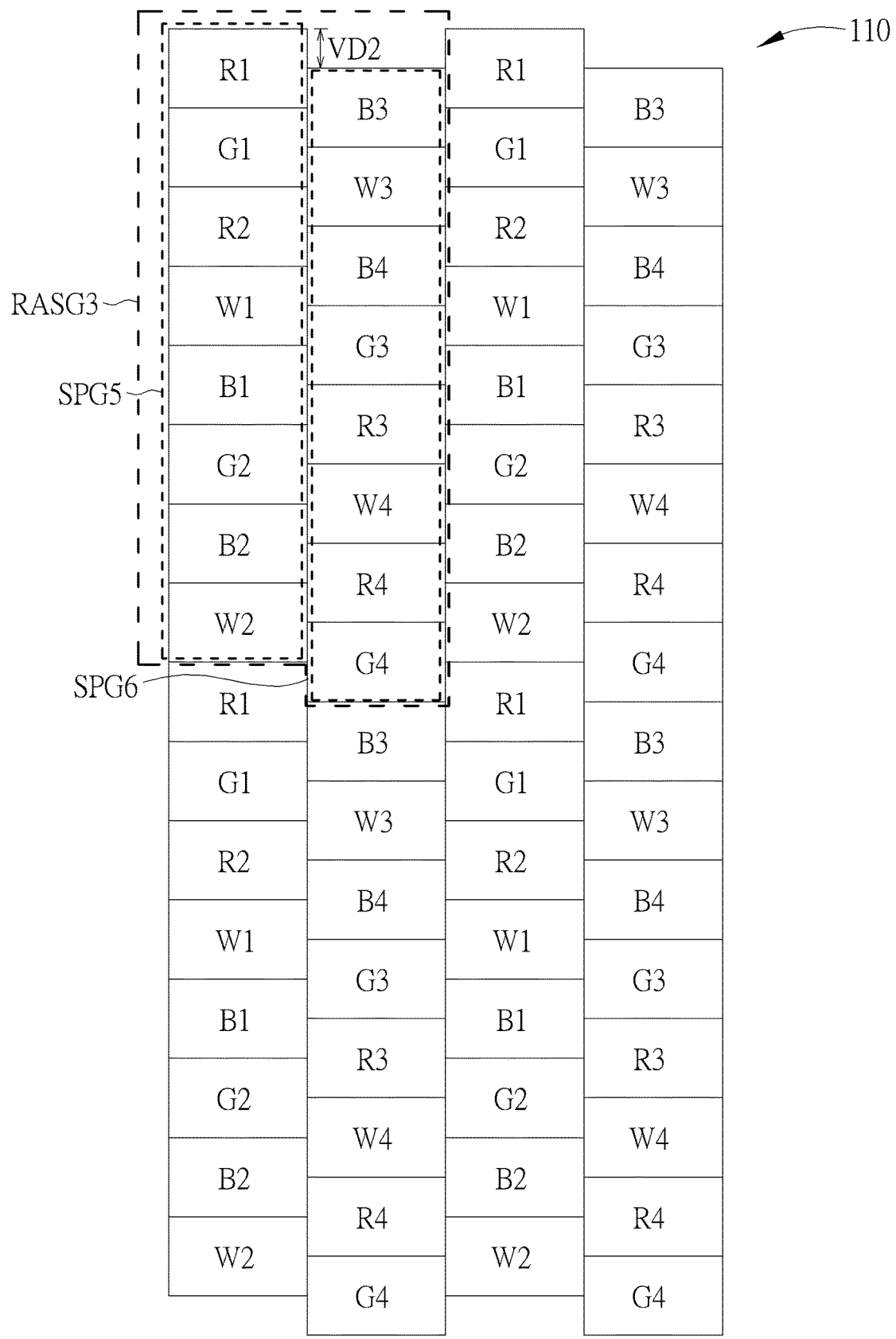
FIG. 11 is a schematic diagram of a display device according to an example of the present invention.

Please refer to FIG. 11, which is a schematic diagram of a display device 110 according to an example of the present invention. Different from the display device 80 shown in FIG. 8, the display device 110 has a vertical displacement VD2 between the sub-pixels of odd columns and the sub-pixels of even columns. In other words, the vertical displacement VD2 exists between two adjacent sub-pixel groups SPG5 and SPG6, whose sub-pixels are disposed in the column direction. In this example, the vertical displacement VD2 is smaller than or equal to half the sub-pixel width WS.

Figure 12:
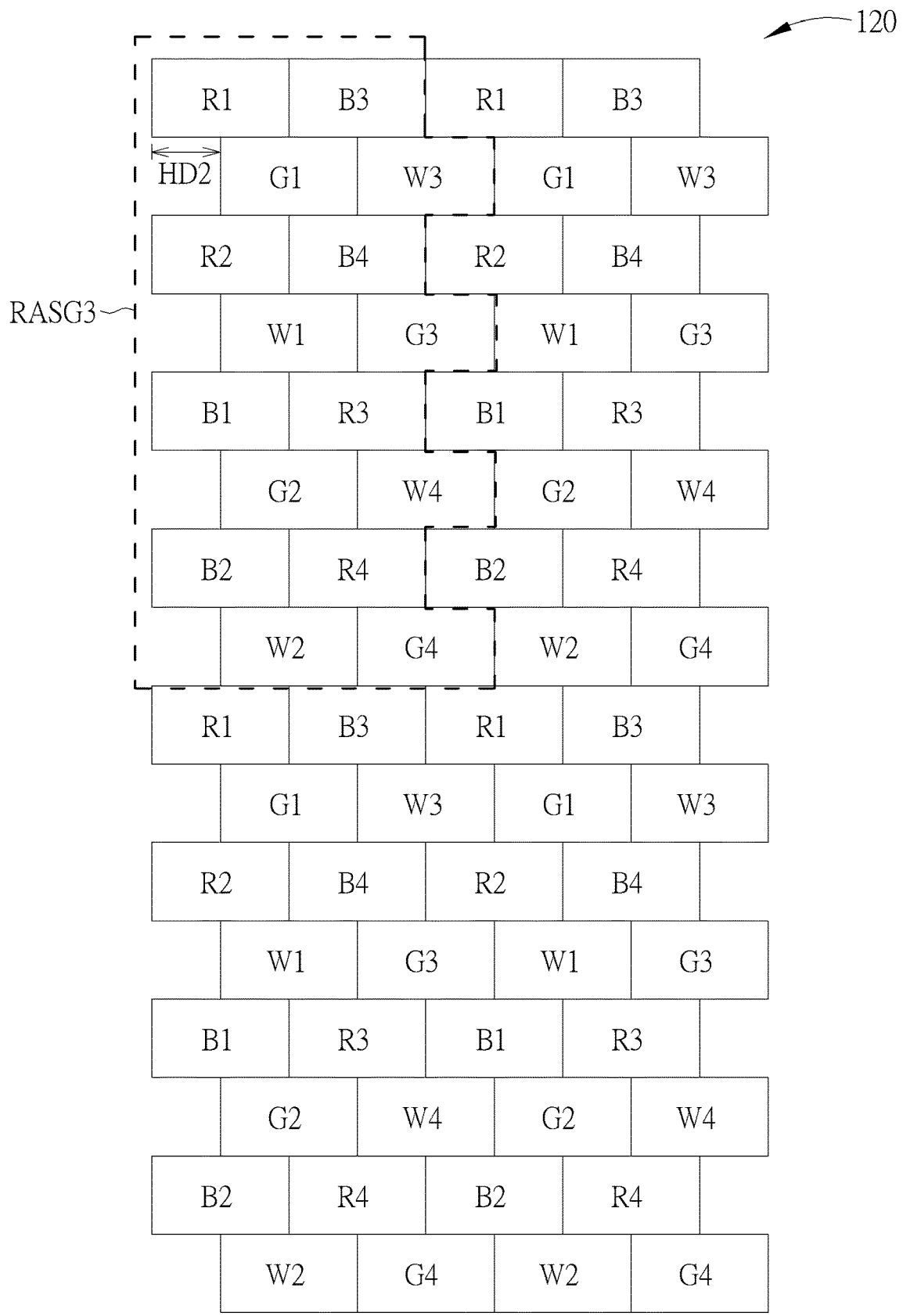
FIG. 12 is a schematic diagram of a display device according to an example of the present invention.

Please refer to FIG. 12, which is a schematic diagram of a display device 120 according to an example of the present invention. In comparison with the display device 80 shown in FIG. 8, a horizontal displacement HD2 exists between the sub-pixels of odd rows and the sub-pixels of even rows. That is, the horizontal displacement HD2 exists between two vertically adjacent sub-pixels in each of the sub-pixel groups SPG5 and SPG6, whose sub-pixels are disposed in the column direction. In this example, the horizontal displacement HD2 is smaller than or equal to half the horizontal length of a single sub-pixel.

The display devices of the above examples are realized by a novel sub-pixel position arrangement. By adopting the novel sub-pixel position arrangement, the luminance of lower luminance colors displayed by the display device is enhanced and thereby the perceived brightness of the display device is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A display device, comprising:
   a plurality of sub-pixel groups, wherein each of the plurality of sub-pixel groups comprises eight sub-pixels disposed in a row direction or in a column direction and the eight sub-pixels comprise:
   two red (R) sub-pixels;
   two blue (B) sub-pixels;
   two green (G) sub-pixels; and
   two sub-pixels of a predetermined color (X),
   wherein in each of the plurality of sub-pixel groups, a distance between the red sub-pixels or between the blue sub-pixels is smaller than a distance between the green sub-pixels or between the sub-pixels of the predetermined color, and the sub-pixels of the predetermined color have a luminance higher than a luminance of the red sub-pixels and the blue sub-pixels;
   wherein along one of the row direction and the column direction, a repeatedly arranged color sequence of the eight sub-pixels from left to right in the row direction or from top to bottom in the column direction is R, G, R, X, B, G, B, X, or B, X, B, G, R, X, R, G, and sub-pixels of the same color in each of the plurality of sub-pixel groups are corresponding to different polarities; and
   wherein the plurality of sub-pixel groups comprises one of following four kinds of displacement:

(1) a first horizontal displacement, between two adjacent sub-pixels which are respectively disposed in two adjacent sub-pixel groups of the plurality of sub-pixel groups having sub-pixels disposed in the row direction, (2) a first vertical displacement, between two adjacent sub-pixels in each of the plurality of sub-pixel groups having sub-pixels disposed in the row direction, (3) a second horizontal displacement between two adjacent sub-pixels in each of the plurality of sub-pixel groups having sub-pixels disposed in the column direction, and (4) a second vertical displacement exists between two adjacent sub-pixels which are respectively disposed in two adjacent sub-pixel groups of the plurality of sub-pixel groups having sub-pixels disposed in the column direction.

2. The display device of claim 1, wherein the plurality of sub-pixel groups comprises a first sub-pixel group and an adjacent second sub-pixel group, and every two adjacent sub-pixels respectively disposed in the first sub-pixel group and the second sub-pixel group are corresponding to different colors.

3. The display device of claim 1, wherein a pixel displays red component or blue component by not only a red or blue sub-pixel of the pixel but also another sub-pixel of the same color of a neighbor pixel, and the pixel and the neighbor pixel are in the same sub-pixel group.

4. The display device of claim 1, wherein a pixel displays green component or the predetermined color component by not only a green sub-pixel or a predetermined-colored sub-pixel of the pixel but also another sub-pixel of the same color of a neighbor pixel, and the pixel and the neighbor pixel are in different sub-pixel groups.

* * * * *